(12) United States Patent
Shannon et al.

(10) Patent No.: US 10,771,412 B2
(45) Date of Patent: Sep. 8, 2020

(54) CHARACTER-BY-CHARACTER CHAT FOR AUTONOMOUS VEHICLE SUPPORT

(71) Applicant: GM GLOBAL TECHNOLOGY OPERATIONS LLC, Detroit, MI (US)

(72) Inventors: Jacqueline Mary Shannon, San Francisco, CA (US); Stephanie Olivia Engle, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 38 days.

(21) Appl. No.: 16/173,524

(22) Filed: Oct. 29, 2018

(65) Prior Publication Data

US 2020/0137006 A1   Apr. 30, 2020

(51) Int. Cl.
| | |
|---|---|
| *G06F 3/048* | (2013.01) |
| *H04L 12/58* | (2006.01) |
| *G06F 3/0481* | (2013.01) |
| *G06F 3/0489* | (2013.01) |
| *H04L 29/08* | (2006.01) |
| *H04L 29/06* | (2006.01) |

(52) U.S. Cl.
CPC .......... *H04L 51/046* (2013.01); *G06F 3/0481* (2013.01); *G06F 3/0489* (2013.01); *H04L 51/16* (2013.01); *H04L 63/0428* (2013.01); *H04L 65/1069* (2013.01); *H04L 67/12* (2013.01); *H04L 63/166* (2013.01)

(58) Field of Classification Search
CPC ......... B60K 35/00; H04L 51/02; H04L 51/10; H04L 51/38
See application file for complete search history.

(56) References Cited

U.S. PATENT DOCUMENTS

| | | | |
|---|---|---|---|
| 7,430,428 | B2 | 9/2008 | Van Bosch et al. |
| 7,957,744 | B2 | 6/2011 | Oesterling et al. |
| 8,600,011 | B2 | 12/2013 | Gouvia et al. |
| 9,614,913 | B2 | 4/2017 | Ishfaq et al. |
| 2012/0034938 | A1* | 2/2012 | Kreitzer .............. H04L 51/04 455/466 |
| 2015/0350251 | A1* | 12/2015 | Brander ............... H04L 63/20 713/168 |
| 2018/0365740 | A1* | 12/2018 | Nix ..................... B60W 50/08 |
| 2019/0306860 | A1* | 10/2019 | Ciochina ............. H04W 72/12 |

\* cited by examiner

*Primary Examiner* — Claudia Dragoescu
(74) *Attorney, Agent, or Firm* — Medley, Behrens & Lewis, LLC

(57) ABSTRACT

A user interface device is described herein that executes a chat application to transmit and/or receive text on a character-by-character basis as a message is being typed. The user interface device establishes a communication link to a remote computing device, wherein one or more outputs each defining a character of the text are transmitted and/or received by the user interface device through the communication link. The characters of the text are displayed in real-time as the one or more outputs are generated. The communication link between the user interface device and the remote computing device can be further established through an autonomous vehicle.

20 Claims, 8 Drawing Sheets

CHARACTER-BY-CHARACTER CHAT FOR AUTONOMOUS VEHICLE SUPPORT

BACKGROUND

An autonomous vehicle is a motorized vehicle that can operate without a human driver. Unlike human-operated vehicles where a passenger could ask a driver about the vehicle's condition, the current travel route, or other similar matters, a passenger of an autonomous vehicle frequently directs such inquires to a customer support agent stationed at a remote location. A user interface device is incorporated in the autonomous vehicle to connect the passenger to customer support, which may include interacting with a live support agent. While the user interface device can be configured to provide support through both visual and audio/verbal interaction, hearing-impaired passengers are typically limited to visual communications, such as written messages.

Problematically for autonomous vehicles is that communication systems oftentimes transmit communications through wireless Internet Protocol (IP) services that can be limited technologically with respect to transmission of Text Telephone (TTY) communications conventionally used by hearing-impaired individuals. For example, TTY communications such as Baudot character strings defined by 1400 to 1800 Hz tones can generate an echo or continuous noise when transmitted over IP networks, despite echo cancellation techniques intended to improve the quality of IP-based communications. TTY communications are also more prone to packet loss than conventional voice services, wherein packets of data transmitted over the IP network do not reach the intended recipient.

Although some compression coders/decoders (codecs) such as G.711 and quality-of-service techniques can allow Voice over Internet Protocol (VoW) networks to support TTY communications, they are bandwidth intensive and therefore not favorable for bandwidth efficient wireless networks of autonomous vehicles. Further, some bandwidth management algorithms apply compression techniques that, while optimized for voice communications, can distort TTY tones. Consequently, when either a Baudot start bit or Baudot stop bit is impaired, synchronization is lost between sending and receiving TTY devices, rendering the transmission unintelligible unless/until synchronization is reestablished.

Thus, implementation of TTY over VoIP may not be a desirable solution in the autonomous vehicle context to satisfy the needs of the hearing-impaired community. In addition, alternative communication techniques defined by messaging environments that transmit and receive text communications (e.g., long-term evolution (LTE) networks) commonly require individuals to type out an entire message before sending the message to a recipient. The recipient of the message can then respond with their own communication by typing an entire reply message before sending the reply message back to the individual. As a result, the nature of generating communications on a message-by-message basis creates a delay that can be undesirable while the sender is typing their message.

SUMMARY

The following is a brief summary of subject matter that is described in greater detail herein. This summary is not intended to be limiting as to the scope of the claims.

Described herein are various technologies pertaining to execution of an Americans with Disabilities Act (ADA) chat application. With more specificity, described herein is a user interface device including the ADA chat application. With still more specificity, described herein is a user interface device having a transmitter and/or receiver configured to transmit an output to, or receive an output from, a remote computing device. A communication link is established between the transmitter/receiver and the remote computing device, wherein the user interface device can receive, through the communication link, one or more outputs from the remote computing device that each define a character of text and display the text on a character-by-character basis as each of the one or more outputs is received from the remote computing device. The user interface device can likewise identify text input to the user interface device through an input tool to generate and transmit the one or more outputs each defining a character of the text, through the communication link, to the remote computing device on a character-by-character basis as each of the one or more outputs is generated.

The user interface device can be disposed in a cabin of the autonomous vehicle in any manner that it is accessible to a passenger thereof. For instance, the user interface device may be a wireless device that is detached/detachable from the autonomous vehicle, such as a handheld device, or the user interface device may be a stationary/wired device affixed to a portion of the autonomous vehicle, such as a dashboard-mounted display. When a passenger of the autonomous vehicle such as a hearing-impaired passenger desires assistance, a chat session can be initiated on the user interface device (e.g., an electronic tablet) to communicate with a remote computing device that is disposed remotely to the autonomous vehicle (e.g., at a workstation of a customer support agent).

Upon initiation of the chat session, the user interface device establishes a communication link that connects the passenger to the remote customer support agent, for example, either through a direct communication link or a communication link that is established through a computing system of the autonomous vehicle. The passenger can use an input tool such as a digital keyboard displayed on a display of the user interface device to generate and transmit messages to the remote computing device of the customer support agent. The message is transmitted on a character-by-character basis as it is typed so that the recipient (e.g., the customer support agent) can see the message as it is being composed, rather than only after it is completed and sent. The message may be transmitted to the remote computing device by a multi-carrier telecommunications module and/or secured by a cryptographic protocol.

The autonomous vehicle can include a plurality of user interface devices configured to communicate simultaneously with one or more remote computing devices. The plurality of user interface devices may be disposed at the front and rear of the cabin of the autonomous vehicle to facilitate passenger access thereto from any seat within the autonomous vehicle. In an example, the plurality of user interface devices can share a same communication link between the autonomous vehicle and a remote computing device such that the plurality of user interface devices can receive a same communication/message from a particular remote computing device in either a common chat session or separate chat sessions. Alternatively, the plurality of first user interface devices are configured to establish distinct communication links for communicating with the plurality of remote computing devices, wherein separate passengers interacting with separate user interface devices can separately transmit/ receive communications to/from certain remote computing devices included in the plurality of remote computing devices.

The user interface device is further configured to receive response messages from the remote computing device, wherein message history can be displayed in a messaging environment that includes received/transmitted messages between devices. Communications received from the remote computing device may require authentication by the user interface device before the characters of the message are displayed by the user interface device. When communication with the user interface device is initiated by the remote computing device, an on-screen notification may be prompted to alert the passenger that customer support is requesting contact. While some communications from customer support may include automated messages, other communications require interaction with a live customer support agent.

Accordingly, real-time receipt/transmission of messages on a character-by-character basis provides improved functionality over conventional TTY communications that commonly include a text message-like message-by-message exchange of communications. Furthermore, chat applications that provide this functionality and improvements/updates thereto can be easily deployed to an entire fleet of autonomous vehicles to provide a continuously improving level of customer support.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
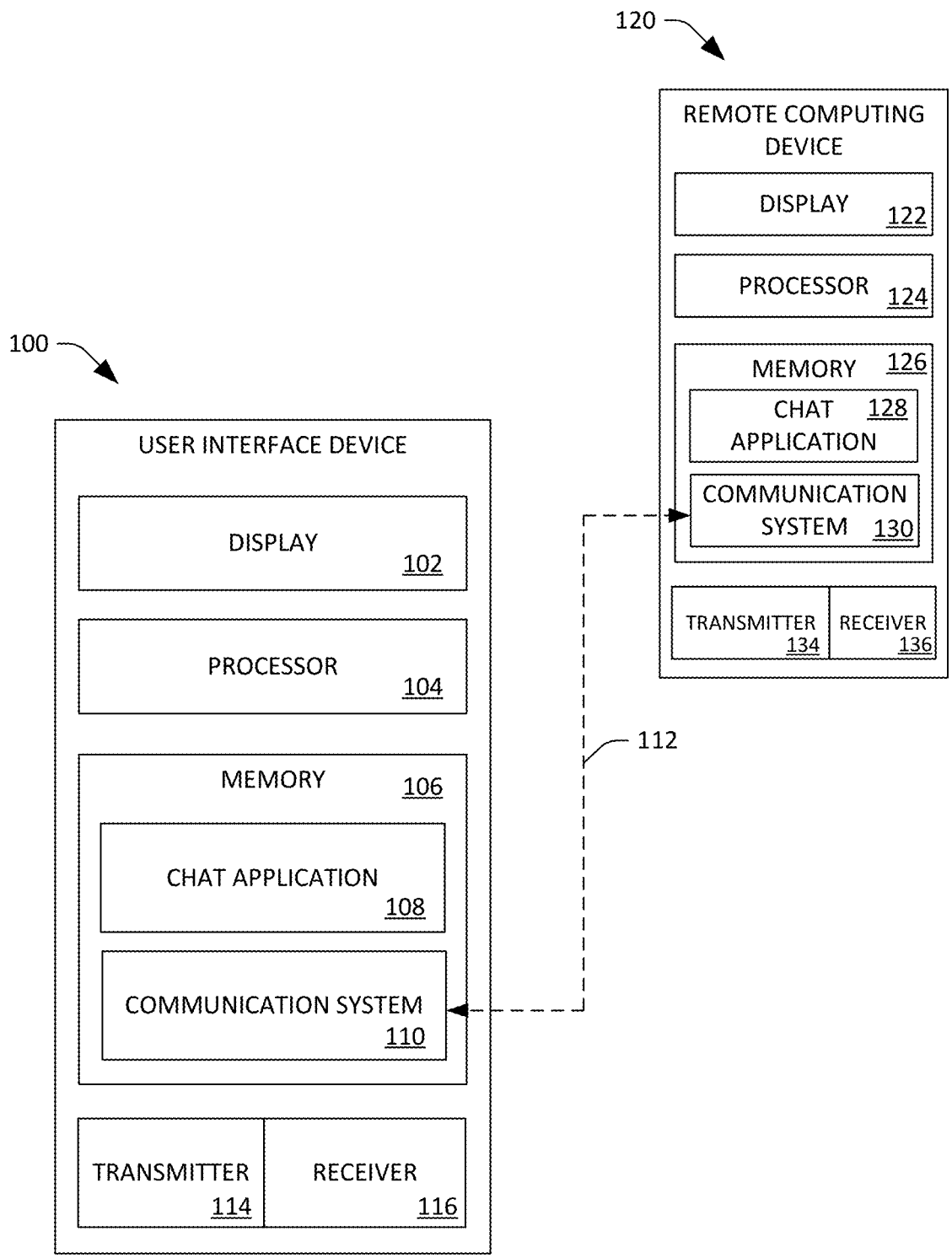
FIG. 1 illustrates an exemplary user interface device in communication with a remote user interface device.

Various technologies pertaining to a user interface device that executes a chat application is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

With reference now to FIG. 1, an exemplary user interface device 100 is illustrated that executes a chat application 108 to transmit and/or receive text on a character-by-character basis as a message is being typed. The user interface device 100 may be any of an electronic tablet device, a dashboard-mounted computing device, a laptop, a smart phone, or other similar device that can execute the chat application 108 to thereby cause a user interface to be displayed on a display 102 of the user interface device 100. The user interface can be configured as a chat window that displays one or more characters of text defined according to one or more inputs received by the user interface device 100.

The user interface device 100 comprises a processor 104 and memory 106 that stores computer-executable instructions that are executed by the processor 104 and cause the processor 104 to perform acts in accordance therewith. Memory 106 further includes the chat application 108 and a communication system 110. The chat application 108 and the communication system 110 may be configured as independent modules of memory 106 or stored in memory of other devices, such as memory of a computing system incorporated in an autonomous vehicle.

The communication system 110 includes executable instructions for operating a transmitter 114 and a receiver 116 disposed in the user interface device 100. For example, the communication system 110 may establish a communication link 112 for the transmitter 114 and/or the receiver 116 to maintain communication with a remote computing device 120. The transmitter 114 and the receiver 116 may be combined as a transceiver configured to transmit and receive one or more outputs to/from an external device, such as the remote computing device 120. In an exemplary embodiment, the communication system 110 may be a multi-carrier telecommunication module that receives LTE signals from a plurality of telecommunication providers (e.g., Verizon, AT&T, T-Mobile, etc.) to optimize transmission speed, latency, and reliability of communication signals through access to multiple carrier networks.

The communication link 112 may be established between the remote computing device 120 and the transmitter/receiver of the user interface device 100 to transmit and receive the one or more outputs to/from the remote computing device 120. The remote computing device 120 can be a similar device in both configuration and functionality to the user interface device 100. For example, the remote computing device 120 can be an electronic tablet device, a laptop computer, a desktop computer, a smart phone, or other similar device configured to execute a similar chat application 128 to the chat applications 108. The remote computing device 120 can include a similar display 122, a similar processor 124, a similar transmitter 134 and receiver 136, and a similar memory 126 having separately executable instructions for the similar chat application 128 and a similar communication system 130.

The one or more outputs generated by the user interface device 100 may be secured by a cryptographic protocol as each output is generated. For example, the one or more outputs defining characters of text may be cryptographically signed by Transport Layer Security (TLS) to ensure authenticity when received by the remote computing device 120. TLS and other cryptographic protocols are configured to safeguard privacy/security by requiring authentication of data transmitted through the communication link 112. Accordingly, a conversation including a hearing-impaired individual can occur directly between the user interface device 100 and the remote computing device 120 without a need for a telecommunications relay service to translate messages from text-to-voice or voice-to-text and with improved privacy/security in comparison to other architectures that include third-party intermediaries.

Displaying text on a character-by-character basis by the display 102 of the user interface device 100 may likewise require authenticating data as each of the one or more outputs is received from the remote computing device 120. In particular, the remote computing device 120 can similarly secure data transmitted to the user interface device 100 through the communication link 112 by a cryptographic protocol such as TLS. A notification of a chat request, for example, that can be accepted or denied by a user of the user interface device 100, may be displayed on the display 102 when a communication with the user interface device 100 is initiated by the remote computing device 120.

Figure 2:
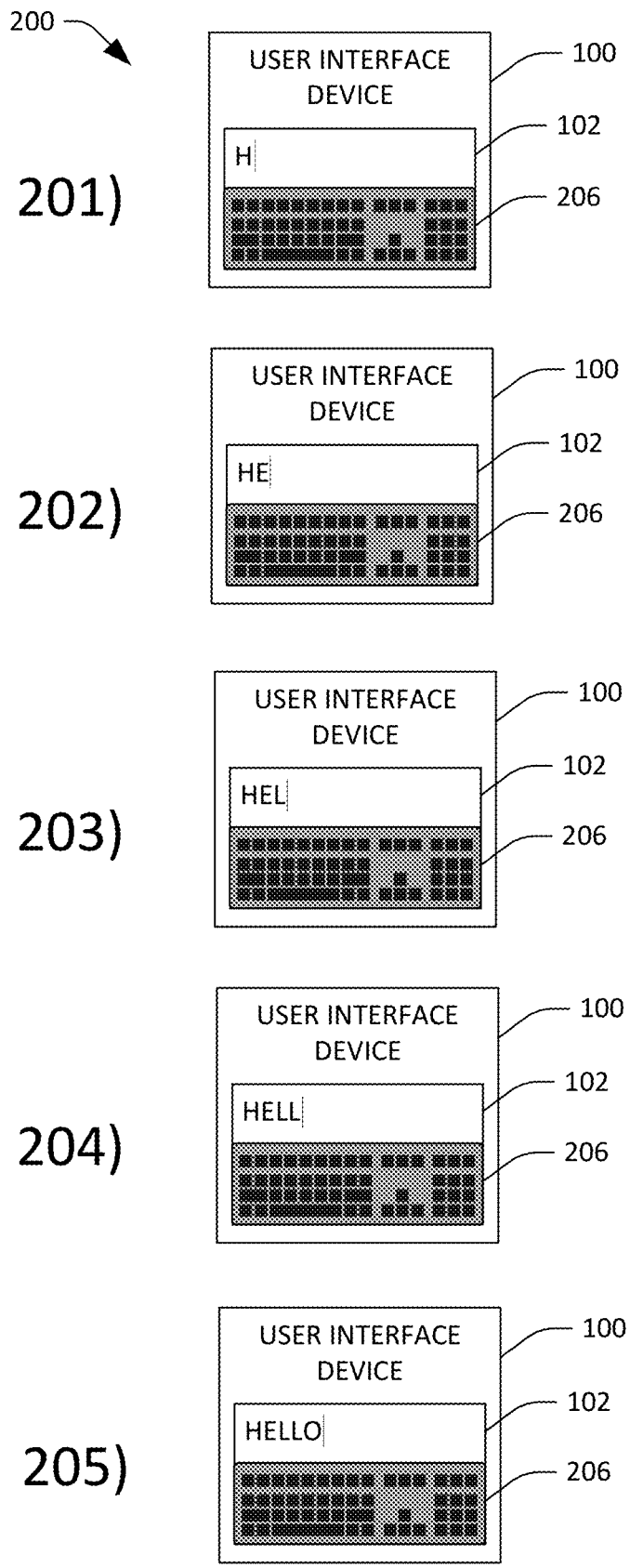
FIG. 2 is an exemplary series of screenshots that illustrate text being displayed by a user interface device on a character-by-character basis.

With reference now to FIG. 2, diagram 200 illustrates a series of sequential screenshots 201-205 wherein text is input to a user interface device 100 on a character-by-character basis. The user interface device 100 may receive the inputs (e.g., characters of message) through an input tool 206 such as a virtual keyboard formed on a touchscreen display 102 of the user interface device 100. A plurality of input tools 206 including, but not limited to, a physical keyboard, a mouse, a trackpad, a trackwheel, etc., can also be connected to the user interface device 100 to generate inputs thereto.

A processor in communication with the input tool 206 and the display 102 identifies the text input through the input tool 206 and causes the text to be displayed by the display 102 on a character-by-character basis. In an example, the input may be defined by a backspace or delete key that that removes the text from the display 102 in real time on character-by-character basis. The processor is also in communication with the transmitter and the receiver of the communication system. Thus, screenshots 201-205 can be representative of text that is either being input to or received by the user interface device 100.

Figure 3:
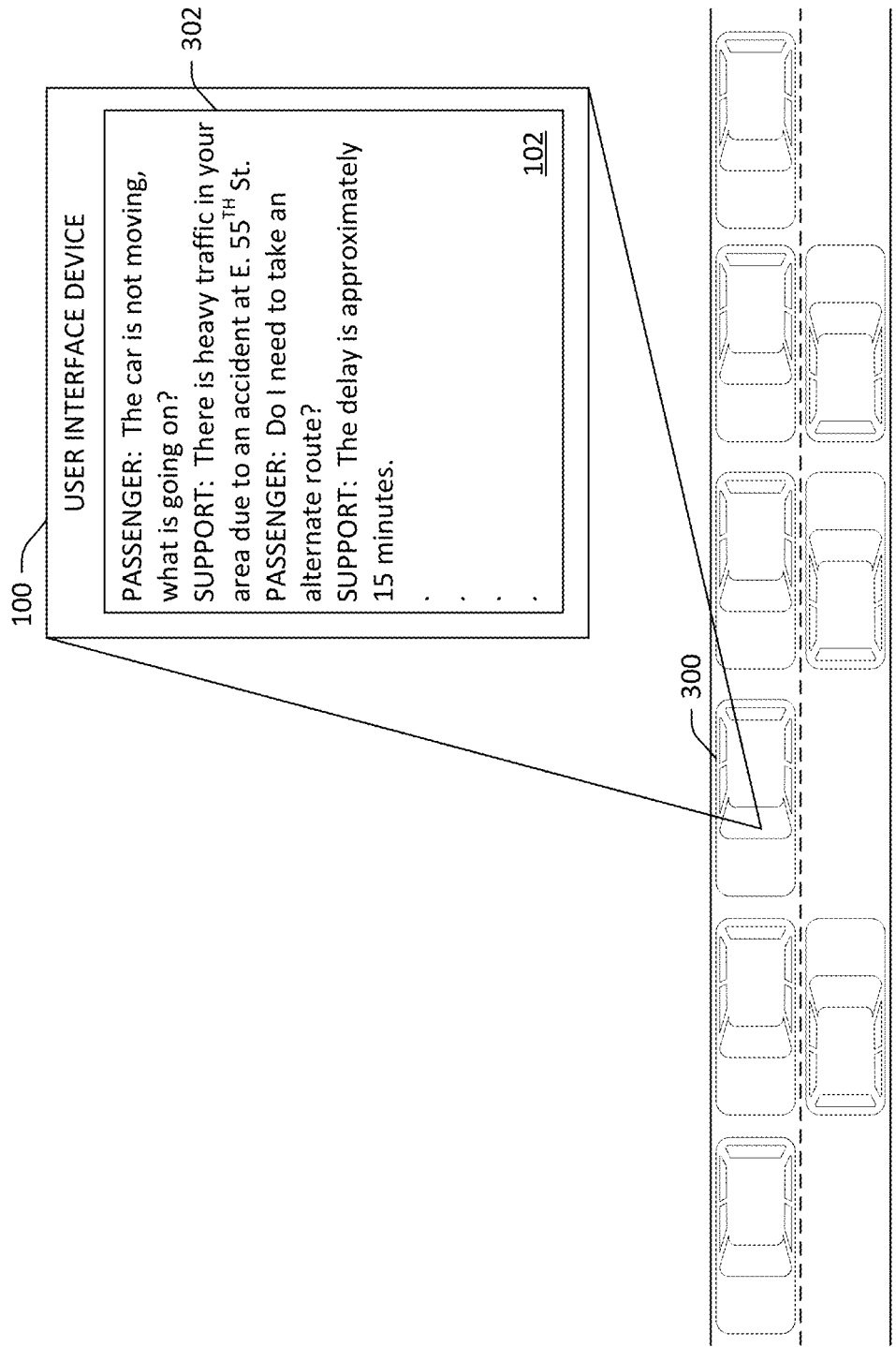
FIG. 3 illustrates an exemplary messaging environment defined by execution of a chat application.

With reference now to FIG. 3, the user interface device 100 is incorporated in an autonomous vehicle 300 (e.g., as a dash-mounted display or as a removable tablet), wherein a chat application is executed by the user interface device 100. A user interface generated in response to execution of the chat application is displayed in the form of a messaging environment 302 on the user interface device 100. The messaging environment 302 is configured to display text in real-time on a character-by-character basis as the text is entered into either the user interface device 100 by a passenger of the autonomous vehicle 300 or into a remote user interface device, for example, by a customer support agent.

Text that is input into the messaging environment 302 is identified by a computing system of the autonomous vehicle 300 and/or the user interface device 100 to generate one or more outputs that each define a character of the text. For example, a passenger may type text such as "The car is not moving, what is going on?" As soon as the first letter of the first word is typed, in this case the "T" in "The", the character is transmitted to and displayed by the remote computing device. If the character (e.g., the "T") is deleted by the passenger, the messaging environment 302 is updated and a second output is transmitted that further removes the character from being display by the remote computing device. The remote computing device continues to receive the text on a character-by-character basis until the passenger finishes typing his or her message in the messaging environment 302.

The customer support agent can respond to the passenger's message by inputting responsive text through the remote computing device. The remote computing device may be associated with a separately executable chat application to transmit the responsive text back through the communication link to the messaging environment 302 of the user interface device 100. Similar to the manner in which text is transmitted, text received from the remote computing device is displayed in the messaging environment 302 on a character-by-character basis in real-time as the text is being typed, for example, by the customer support agent.

Accordingly, one or more outputs from the remote computing device each defining a character of the text in the messaging environment 302 can be received by the user interface device 100. For example, the customer support agent may respond by typing text such as "There is heavy traffic in your area due to an accident at E. 55$^{th}$ St." As soon as the first letter of the first word is typed by the customer support agent, in this case the "T" in "There", the character is received and displayed in the messaging environment 302 on the user interface device 100. If the character (e.g., the "T") is deleted by the customer support agent, the message is updated by a second output from the remote computing device that removes the character from being display in the messaging environment 302 on the user interface device 100. The messaging environment 302 continues to display the text on a character-by-character basis until the customer support agent or other user of the remote computing device finishes typing his or her response.

Figure 4:
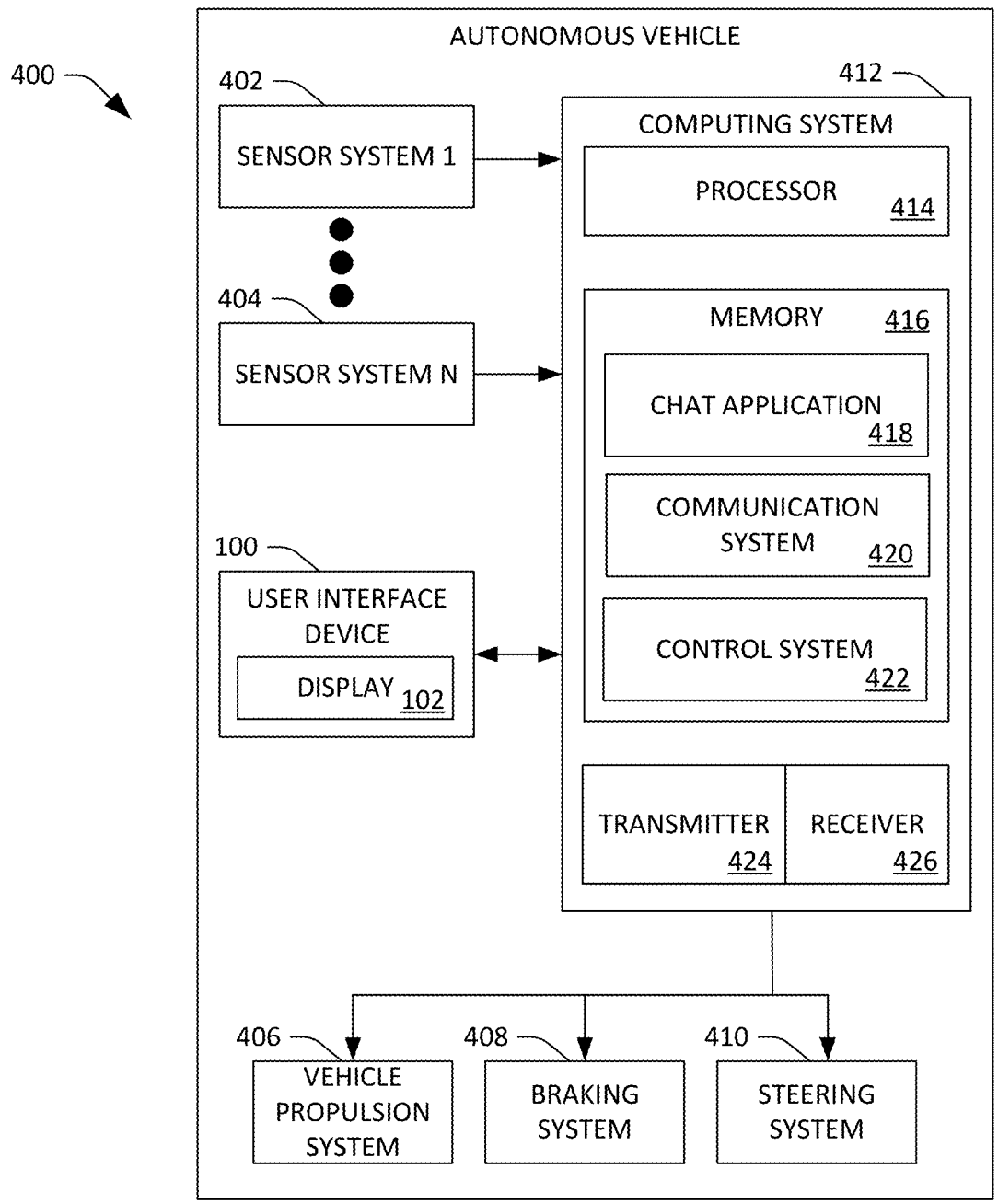
FIG. 4 illustrates an exemplary autonomous vehicle including a user interface device.

With reference now to FIG. 4, an exemplary autonomous vehicle 400 is illustrated. The autonomous vehicle 400 can be the autonomous vehicle 300 of FIG. 3. The autonomous vehicle 400 can navigate about roadways without a human driver based upon sensor signals output by sensor systems 402-404 of the autonomous vehicle 400. The autonomous vehicle 400 includes a plurality of sensor systems 402-404 (a first sensor system 402 through an Nth sensor system 404). The sensor systems 402-404 are of different types and are arranged about the autonomous vehicle 400. For example, the first sensor system 402 may be a camera sensor system and the Nth sensor system 404 may be a lidar system. Other exemplary sensor systems include radar sensor systems, global positioning system (GPS) sensor systems, infrared sensor systems, sonar sensor systems, and the like. Some or all of the plurality of sensor systems 402-404 may comprise articulating sensors. An articulating sensor is a sensor that may be oriented (i.e., rotated) by the autonomous vehicle 400 such that a field of view of the articulating sensor may be directed towards different regions surrounding the autonomous vehicle 400.

The autonomous vehicle 400 further includes several mechanical systems that are used to effectuate appropriate motion of the autonomous vehicle 400. For instance, the mechanical systems can include but are not limited to, a vehicle propulsion system 406, a braking system 408, and a steering system 410. The vehicle propulsion system 406 may include an electric motor, an internal combustion engine, or both. The braking system 408 can include an engine break, brake pads, actuators, and/or any other suitable componentry that is configured to assist in decelerating the autonomous vehicle 400. The steering system 410 includes suitable componentry that is configured to control the direction of movement of the autonomous vehicle 400 during propulsion.

The autonomous vehicle 400 additionally comprises a computing system 412 that is in communication with the sensor systems 402-404, the user interface device 100, and mechanical systems such as the vehicle propulsion system 406, the braking system 408, and the steering system 410. The computing system 412 includes a processor 414 and memory 416 that comprises computer-executable instructions which are executed by the processor 414. In an example, the processor 414 and memory 416 of the computing system 412 can function as the processor 104 and memory 106 of the user interface device 100.

Memory 416 further includes a chat application 418, a communication system 420, and a control system 422. The control system 422 is configured to control operation of the vehicle propulsion system 406, the braking system 408, and/or the steering system 410. The control system 422 can execute instructions that define a maneuver for the autonomous vehicle 400 in accordance with detected objects, the configuration of a traffic light and/or traffic lane, as well as the applicable laws of the locality in which the autonomous vehicle 100 is being operated. The chat application 418 and the communication system 420 may function as the chat application 108 and the communication system 110 of the user interface device 100.

The user interface device 100 can be included in the autonomous vehicle 400 (e.g., inside a cabin of the autonomous vehicle 400). Text displayed by the display 102 can be defined by the computing system 412 based upon executable instructions stored in memory 416 of the computing system 412. For example, the user interface device 100 can be linked to the computing system 412 to execute the chat application 418 and define communications that are transmitted/received by a transmitter 424 and a receiver 426 through the communication link 112, rather than incorporating independent systems, components, and/or modules in the user interface device 100.

Figure 5:
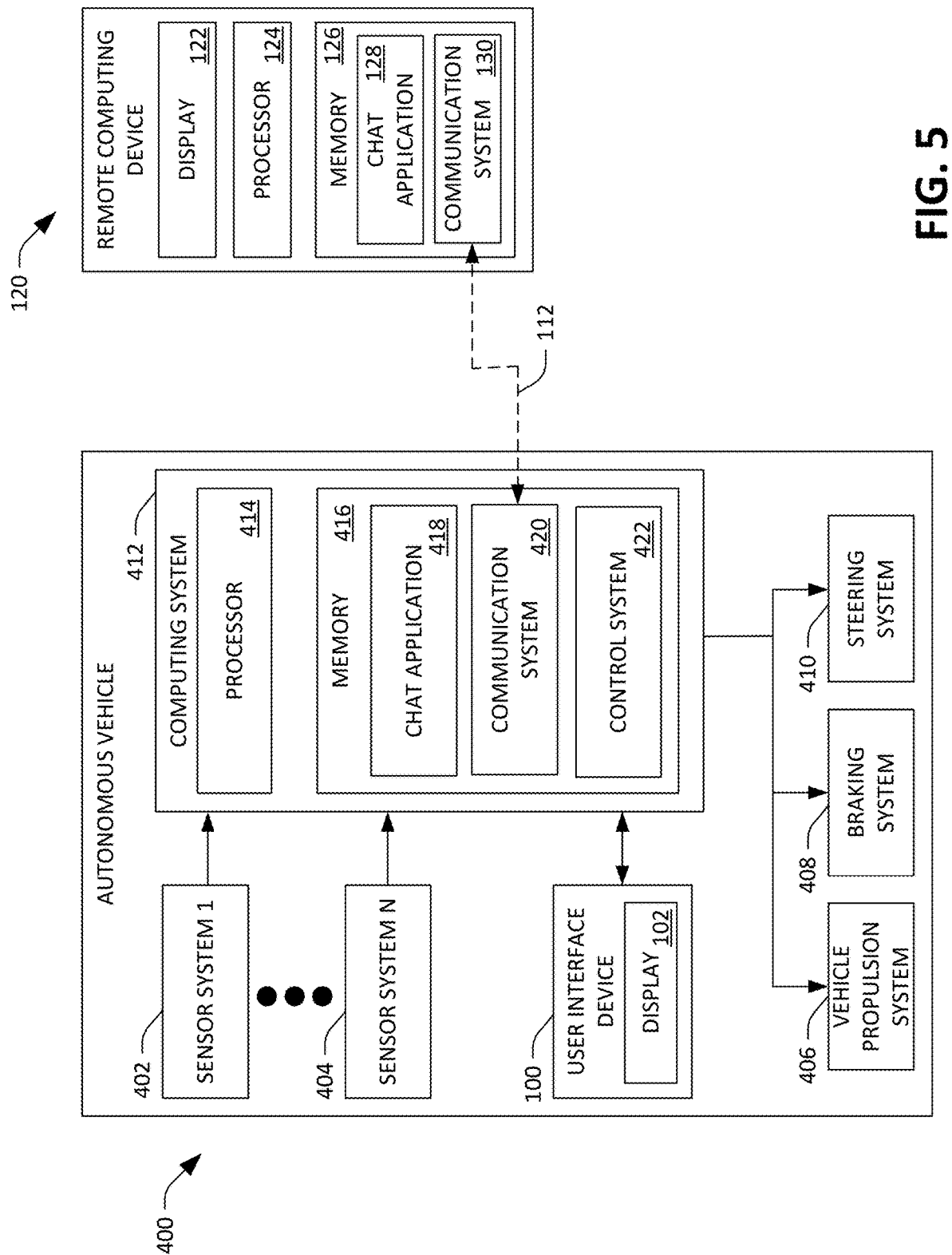
FIG. 5 illustrates an exemplary environment in which a user interface device communicates with a remote computing device via a communication link established by an autonomous vehicle.

With reference now to FIG. 5, the communication link 112 can be established through the autonomous vehicle 400 to connect the user interface device 100 to a remote computing device 120 that is disposed remotely to the autonomous vehicle 400. The remote computing device 120 can be an electronic tablet device, a laptop computer, a desktop computer, a smart phone, or other similar device configured to execute a similar chat application 128 to the chat applications (108 and 418). The remote computing device 120 can also be a device incorporated in a different autonomous vehicle from the autonomous vehicle 400. In particular, the remote computing device 120 can be any device that includes similar functionality to the user interface device 100. For example, the remote computing device 120 may include a similar display 122, a similar processor 124, and a similar memory 126 having separately executable instructions for a similar chat application 128 and a similar communication system 130.

The user interface device 100 may be in electrical communication with the computing system 412 or communicate with the computing system 412 through wireless signals. In an exemplary embodiment, the autonomous vehicle 400 is in communication with a plurality of user interface devices configured to communicate simultaneously with a plurality of remote computing devices, so that separate passengers can transmit separate messages/inquires on an individual basis to a plurality of customer support agents operating the plurality of remote computing devices. In another exemplary embodiment, the remote computing device 120 can be configured to define a plurality of chat sessions so that a single customer support agent can communicate with the plurality of user interface devices via the plurality of chat sessions.

Figure 6:
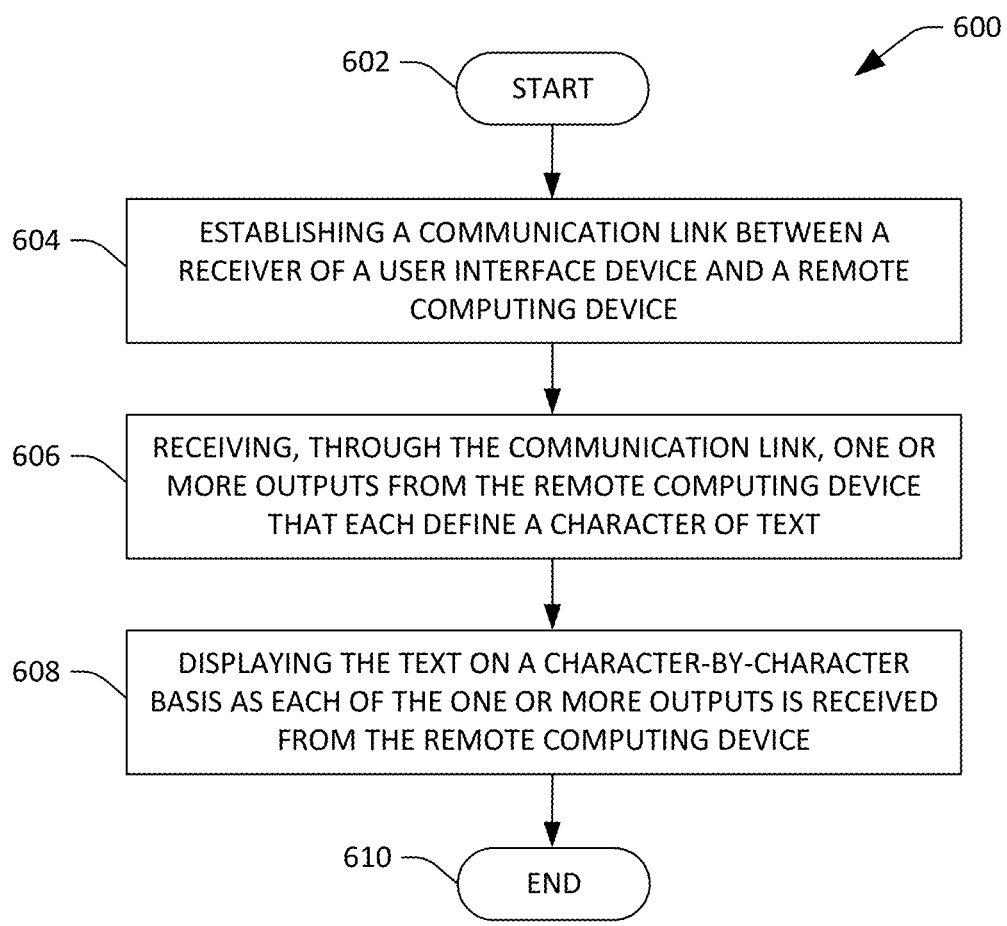
FIG. 6 is a flow diagram illustrating an exemplary methodology for displaying text on a user interface device on a character-by-character basis.
Figure 7:
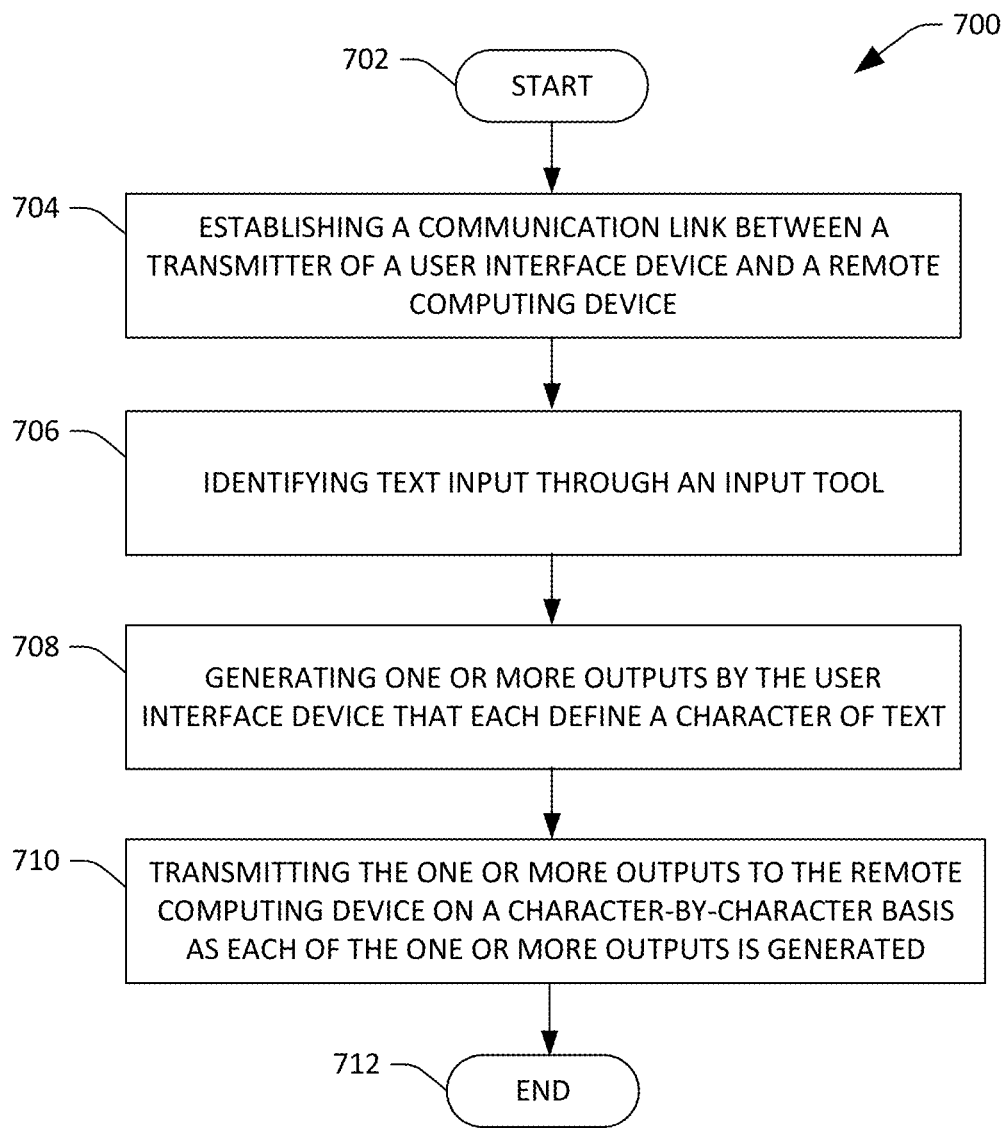
FIG. 7 is a flow diagram illustrating an exemplary methodology for transmitting text from a user interface device on a character-by-character basis.

FIGS. 6 and 7 illustrate exemplary methodologies for displaying and transmitting text on a character-by-character basis. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, an exemplary methodology 600 for displaying text on a character-by-character basis is illustrated. The methodology 600 starts at 602, and at 604 a communication link is established between a receiver of a user interface device and a remote computing device. The user interface device can be a standalone device, a device that is in removable communication with an autonomous vehicle (e.g., an electronic tablet device), or a device that is affixed to/incorporated in the autonomous vehicle such as a dash-mounted display or a control panel. The remote computing device is disposed remotely to the autonomous vehicle and communicates wirelessly through the communication link with the user interface device.

At 606, one or more outputs from the remote computing device are received through the communication link by the user interface device. Each of the one or more outputs define a character of text, for example, incorporated in a message from a customer support agent. The one or more outputs are received individually by the user interface device in a sequential order that corresponds to the communicated text. At 608, the user interface device displays the text on a character-by-character basis as the one or more outputs are received from the remote computing device. The methodology 600 completes at 610.

Referring now to FIG. 7, an exemplary methodology 700 for transmitting text on a character-by-character basis is illustrated. The methodology 700 starts at 702, and at 704 a communication link is established between the transmitter of a user interface device and a remote computing device. The user interface device can be a standalone device, a device that is in removable communication with an autonomous vehicle (e.g., an electronic tablet device), or a device that is affixed to/incorporated in the autonomous vehicle such a dash-mounted display or a control panel. The remote computing device is disposed remotely to the autonomous vehicle and receives communications transmitted wirelessly through the communication link from the user interface device.

At 706, text input through an input tool (e.g., by a passenger of an autonomous vehicle and/or by a user of an interface device) is identified by the user interface device. The text may be input through a virtual keyboard displayed by the user interface device or through a physical device connectable thereto. At 708, the user interface device generates one or more outputs, wherein each of the one or more outputs define a character of text, for example, incorporated in a message typed by the passenger of the autonomous vehicle and/or the user of the interface device. At 710, the user interface device transmits the one or more outputs to the remote computing device on a character-by-character basis as each of the one or more outputs are generated. Specifically, as individual characters of the text are input into the user interface device through the input tool, the characters are transmitted to and displayed by the remote computing device in real-time. The methodology 700 completes at 712.

Figure 8:
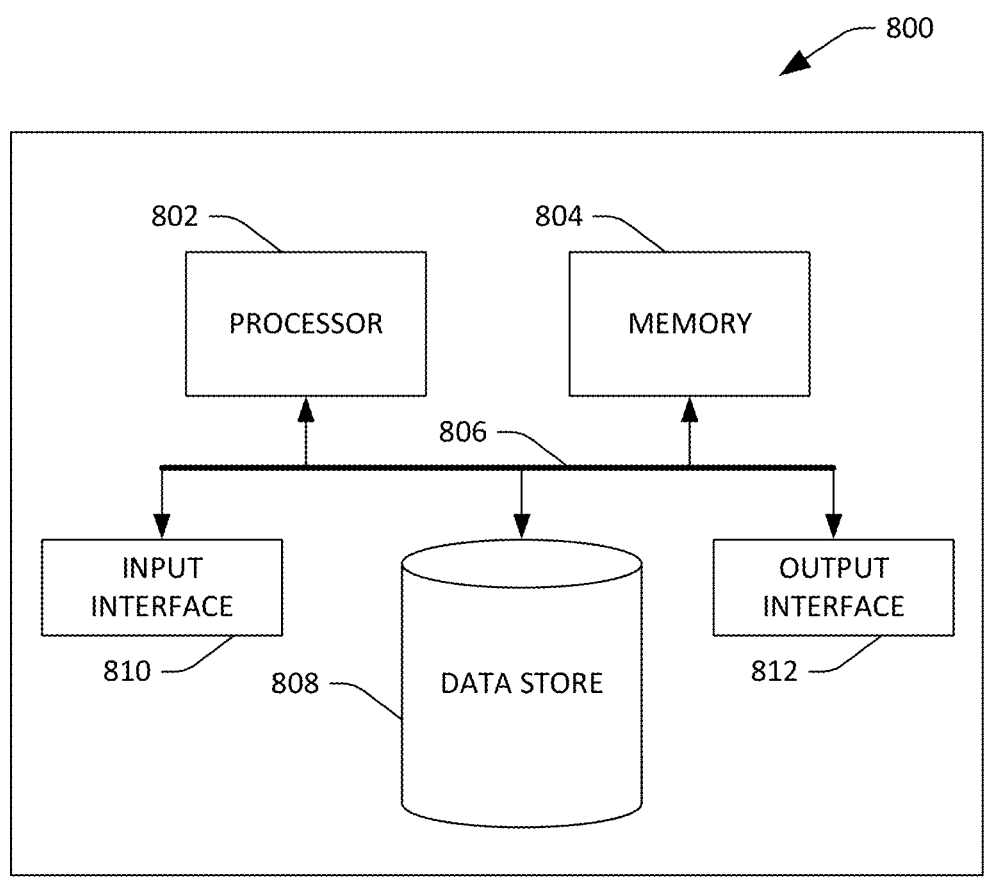
FIG. 8 illustrates an exemplary computing system.

Referring now to FIG. 8, a high-level illustration of an exemplary computing device 800 that can be used in accordance with the systems and methodologies disclosed herein is illustrated. For instance, the computing device 800 may be or include the user interface device 100. The computing device 800 includes at least one processor 802 that executes instructions that are stored in a memory 804. The instructions may be, for instance, instructions for implementing functionality described as being carried out by one or more modules and systems discussed above or instructions for implementing one or more of the methods described above. In addition to storing executable instructions, the memory 804 may also store location information, distance information, direction information, etc.

The computing device 800 additionally includes a data store 808 that is accessible by the processor 802 by way of the system bus 806. The data store 808 may include executable instructions, location information, distance information, direction information, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the user interface device 100 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user interface device disposed within an autonomous vehicle, the user interface device comprising:

a display;

a processor in communication with the display; and
memory that stores instructions that, when executed by the processor, cause the processor to perform acts comprising:
establishing a communication link between the user interface device and a remote computing device, wherein the remote computing device is disposed remotely to the autonomous vehicle;
receiving, through the communication link, one or more outputs from the remote computing device, wherein each of the one or more outputs define a character of text, and wherein each of the one or more outputs is cryptographically signed;
authenticating each of the one or more outputs received from the remote computing device as the one or more outputs are received from the remote computing device; and
displaying the text on a character-by-character basis on the display within the autonomous vehicle as each of the one or more outputs is received from the remote computing device and authenticated.

2. The user interface device of claim 1, wherein the memory further stores instructions that, when executed by the processor, cause the processor to perform acts comprising:
identifying input text received through an input tool of the user interface device; and
transmitting the input text to the remote computing device on a character-by-character basis as the input text is received by the user interface device.

3. The user interface device of claim 1, wherein the communication link is established through the autonomous vehicle.

4. The user interface device of claim 1, wherein the autonomous vehicle is in communication with a plurality of user interface devices.

5. The user interface device of claim 1, wherein the user interface device is one of an electronic tablet device, a laptop, or a smart phone.

6. The user interface device of claim 1, wherein the memory further stores instructions that, when executed by the processor, cause the processor to perform acts comprising:
displaying a notification on the display when the remote computing device initiates communication with the user interface device.

7. An autonomous vehicle, comprising:
a user interface device, wherein the user interface device comprises a touchscreen display;
a processor in communication with the user interface device; and
memory that stores instructions that, when executed by the processor, cause the processor to perform acts comprising:
establishing a communication link between the autonomous vehicle and a remote computing device, wherein the remote computing device is disposed remotely to the autonomous vehicle;
receiving text inputted through the touchscreen display of the user interface device;
generating one or more outputs, wherein each of the one or more outputs define a character of the text;
cryptographically signing each of the one or more outputs; and
transmitting, via the communication link, the one or more outputs to the remote computing device as each of the one or more outputs is generated and cryptographically signed.

8. The autonomous vehicle of claim 7, wherein the memory further stores instructions that, when executed by the processor, cause the processor to perform acts comprising:
receiving, via the communication link, output text from the remote computing device; and
causing the output text to be displayed on the touchscreen display of the user interface device on a character-by-character basis as the output text is received.

9. The autonomous vehicle of claim 7, wherein the communication link is established through the autonomous vehicle.

10. The autonomous vehicle of claim 7, wherein the autonomous vehicle is in communication with a plurality of user interface devices disposed within the autonomous vehicle.

11. A method performed by a processor of a user interface device, wherein the user interface device is included within and in communication with an autonomous vehicle, the method comprising:
establishing a communication link between the user interface device and a remote computing device, wherein the remote computing device is disposed remotely to the autonomous vehicle;
receiving, through the communication link, one or more outputs from the remote computing device, wherein each of the one or more outputs from the remote computing device define a character of text and wherein each of the one or more outputs from the remote computing device is cryptographically signed;
authenticating each of the one or more outputs received from the remote computing device as the one or more outputs are received from the remote computing device; and
displaying the text on a character-by-character basis as each of the one or more outputs is received from the remote computing device and authenticated.

12. The method of claim 11, wherein the communication link is established through the autonomous vehicle.

13. The method of claim 11, further comprising:
receiving input text inputted to the user interface device;
generating one or more outputs, wherein each of the one or more outputs define a character of the input text; and
transmitting the one or more outputs to the remote computing device on a character-by-character basis as each of the one or more outputs is generated.

14. The method of claim 13, further comprising transmitting the one or more outputs to the remote computing device by a multi-carrier telecommunication module.

15. The method of claim 13, further comprising securing the one or more outputs by a cryptographic protocol.

16. The user interface device of claim 1, further comprising a multi-carrier telecommunication module configured to receive the one or more outputs from the remote computing device.

17. The user interface device of claim 2, wherein the input text transmitted to the remote computing device is cryptographically signed on a character-by-character basis as the input text is received by the user interface device.

18. The autonomous vehicle of claim 8, wherein the output text received from the remote computing device is cryptographically signed by the remote computing device.

19. The autonomous vehicle of claim 8, wherein the memory further stores instructions that, when executed by the processor, cause the processor to perform acts comprising:
    authenticating the output text to be displayed on the touchscreen display of the user interface device on a character-by-character basis as the output text is received.

20. The autonomous vehicle of claim 7, wherein the memory further stores instructions that, when executed by the processor, cause the processor to perform acts comprising:
    displaying a notification on the touchscreen display when the remote computing device initiates communication with the user interface device.

\* \* \* \* \*